NON-DESTRUCTIVE FILM MEMORY ELEMENT

Original Filed April 18, 1961

INVENTORS
HARLEY S. KUKUK
ROBERT E. BOYLAN
BY Charles A. Johnson
ATTORNEY

United States Patent Office 3,302,190
Patented Jan. 31, 1967

3,302,190

NON-DESTRUCTIVE FILM MEMORY ELEMENT

Robert E. Boylan, St. Paul, and Harley S. Kukuk, Egan Township, Dakota County, Minn., assignors to Sperry Rand Corporation, New York, N.Y., a corporation of Delaware Continuation of application Ser. No. 103,906, Apr. 18, 1961. This application Mar. 16, 1965, Ser. No. 440,118
12 Claims. (Cl. 340—174)

This application is a continuation of copending application Serial No. 103,906, filed April 18, 1961 now abandoned.

The present invention relates generally to an improved multiple core element that is adapted to store binary information, and more particularly to such an element in which the information may be read in a nondestructive manner, which element includes a film array together with an associated conductor array wherein the conductors are arranged to form a conductive path which is specific to certain of the films within the array.

Magnetic film elements may be used as information storing devices in digital computers by magnetizing them in one of the two states $+B_r$ and $-B_r$ and the information can be "read" later by determining the instant state of magnetization. Ferromagnetic films, which are useful in this regard, generally possess the magnetic property of uniaxial anisotropy. Film elements fabricated from bistable ferromagnetic materials, which are useful for storing binary information, generally have a substantially square or rectangular magnetic hysteresis loop such as shown in FIGURE 1 of the drawings. When a magnetic field $+H$ is applied to such an element with sufficient strength to overcome the coercivity of $H_c$, the element becomes substantially saturated with a certain maximum flux density $B_m$. On removal of the applied field, the element becomes a permanent magnet with a remanent flux density of $+B_r$, and if the element were ideal and had a truly rectangular hysteresis plot, $B_r$ would equal $B_m$ and the ratio $B_r/B_m$ would equal unity. In actual practice, the fraction $B_r/B_m$ is less than unity, but may be 0.98 or higher, so that the hysteresis plot is almost rectangular.

If a magnetic field is applied in the reverse direction, there will be substantially no change in the flux density B until the field strength reaches the coercivity $-H_c$, and then the flux density will change abruptly to $-B_m$. If this applied field is then removed, the flux density will change to $-B_r$. On again applying a magnetic field in the forward direction, there is substantially no change in flux density until the applied field reaches $H_c$ and then the flux density will increase abruptly to $+B_m$. On removing the applied field, flux density again returns to $+B_r$. Thus, in the absence of applied field, the element exists in only two states of magnetization, $+B_r$ and $-B_r$, and changes abruptly from one state to the other on application of a magnetic field of magnitude equal to or greater than the coercivity $H_c$.

One destructive reading procedure or technique involves initially applying along the easy axis in a given direction a magnetic field of magnitude sufficient to switch the element and then determining whether this reverses the polarity of the element. If this polarity changes from $-B_r$ to $+B_r$ (or vice versa, as the case may be) an electromagnetic pulse is generated in a sensing or output coil or conductor close to the element. In an exemplary case, if no signal pulse is detected, the original polarity was $+B_r$, but if a signal is detected, it was $-B_r$, and vice versa for the other case.

The difficulty with this reading technique is that it destroys the record of information. That is, if the polarity is reversed from $-B_r$ to $+B_r$, it would be necessary to again reverse the polarity to $-B_r$, to preserve the "record." A number of arrangements have been developed to achieve this, all of these being relatively complex.

Therefore, in the preparation, design and use of binary information storage elements it is advantageous to employ multiple core elements, such as two core elements or three core elements, that can be nondestructively read, or which, in other words, may have the prevailing direction of magnetization sensed without it being necessary to destroy the retained information upon each sensing event. These elements make it possible to store binary information over a substantially indefinite period of time and over a substantially indefinite number of individual sensing events without requiring directional restoration. Accordingly, it is possible to enhance the speed and modes of computer or memory element operation as well as the reliability thereof when nondestructive readout characteristics are available. The present invention accomplishes this result by utilizing a memory element composed of two or more film elements. The film elements are arranged so that a readout field can be applied that will switch a preselected element but will not switch the remaining elements so that when the readout field is removed, the first element is restored to its original polarity by the demagnetizing field of the second element. Limitation of the effects of the readout field to the first element is accomplished by utilizing suitable physical arrangements of the conductors that provide the path for the electric current producing the magnetic field. The terms "signal," "pulse," "field," etc. when used herein shall be used interchangeably to refer to the current signal that produces the corresponding magnetic field and to the magnetic field produced by the corresponding current signal.

The switching or rotation of the films is accomplished by the application of combinations of longitudinal and transverse fields in a manner familiar to those skilled in the art.

In accordance with the present invention, a multicore element is arranged having each of the core bodies disposed between the individual substantially parallelly disposed legs of substantially "U"-shaped conductors. By substantially folding a conductor upon itself, it is possible to provide a maximum degree of field intensity in the area substantially along the mean plane that is defined as a plane intermediate the leg portions of the individual conductors. Furthermore, this physical arrangement confines the field primarily to the space between the conductors and minimizes the generation of fields outside the conductors. By physically arranging the various discrete core members as indicated, bias, or information, cores having coercivities which are no greater than the coercivities of the readout core may be used. Therefore, substantially reduced write currents may be utilized. The write cycle times may accordingly be reduced as a consequence of the reduction in the power requirement.

The axis of magnetization of the readout core is disposed in substantial axial alignment with the longitudinal axis of the read conductor. Thus, the film, or readout core, is read by means of the influence of a magnetic field that is arranged to be substantially transverse to the readout core's easy axis of magnetization, while the magnetization of the readout core is restored by means of the longitudinally, or coaxially, arranged demagnetizing field of the information core. The magnetic characteristics of the proposed memory element provide significant responses for applied fields of relatively low magnitudes.

Therefore, it is an object of the present invention to provide an improved multicore magnetic memory element adapted to store binary information and permit non-destructive reading of the element, which element includes "U"-shaped conductors having separate, parallelly disposed portions thereof defining a current path therealong and a flux path therebetween, the flux being at a substantially maximum density in the area disposed between the conductors.

It is still a further object of the invention to provide an improved multicore element adapted to store binary information that comprises a plurality of ferromagnetic films disposed between individual legs of an individual conductor path.

It is yet a further object of the present invention to provide an improved multicore element that is adapted to permit use of ferromagnetic film elements having substantially similar coercivities.

Other and further objects of the present invention will become apparent to those skilled in the art upon a study of the following specification, appended claims, and accompanying drawings wherein:

Figure 1:
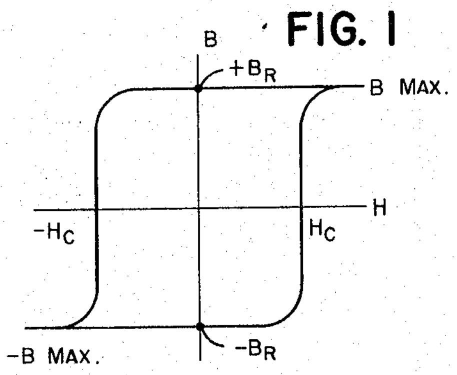
FIGURE 1 is a plot of the drive field applied vs. flux change for a typical ferromagnetic film.
Figure 2:
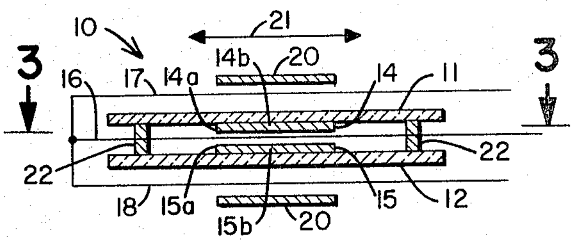
FIGURE 2 is the vertical sectional view of a multicore information storage element using a pair of magnetic elements that are fabricated and assembled in accordance with the present invention.
Figure 3:
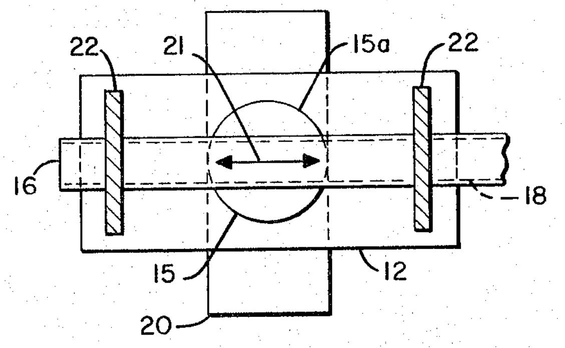
FIGURE 3 is a horizontal sectional view of the storage element of FIGURE 2 taken along the line of and in the direction of the arrows 3—3 of FIGURE 2.

In accordance with the preferred embodiment of the present invention, as illustrated in FIGURES 2 and 3 of the drawings, a multicore element generally designated 10 includes a pair of substrate bases 11 and 12 upon which are mounted a pair of magnetic thin films including a readout film 14 having major planar surfaces 14*a* and 14*b* and a bias film 15 having major planar surfaces 15*a* and 15*b*, the films being ferromagnetic, and having uniaxial anisotropy. A trunk conductor 16 is arranged centrally and in interposed relationship between the thin films 14 and 15, the conductor 16 being divided into a pair of independent conductor elements 17 and 18, these independent conductor elements forming an enclosure with the trunk conductor 16. In other words, the multicore element includes a pair of "U"-shaped conductor elements that enclose the active thin film members between the individual legs thereof. The assembly is further provided with an additional conductor or digit loop 20 that is disposed substantially at right angles to the other conductors, particularly at the point at which individual conductors pass over the active ferromagnetic film areas. The double arrow 21 indicates the direction of orientation of the easy axis of magnetization of the ferromagnetic film material of film cores 14 and 15.

In preparing elements of this type, the substrate is initially ground or etched, or otherwise provided with a substantially flat or planar surface free from sharp irregularities. The surface of the substrate is cleaned and otherwise prepared for the application of a ferromagnetic material thereon. While essentially any of the well known film preparation techniques may be employed to prepare the film on the substrate surface, it is preferred that the technique set forth in the patent issued to S. M. Rubens identified by the Number 2,800,282 be used. While the specific ferromagnetic materials employed are not critical to the operation of the apparatus, it is one of the objects of this invention to permit the utilization of material having relatively low coercive forces. In addition, it is essential that the magnitude of the demagnetizing field of the information core be sufficiently large to restore the readout core to its original polarity when the transverse readout pulse is removed. This magnitude is dependent on the dimensions and magnetic characteristics of the films. Many practicable arrangements require that the demagnetizing field of the information core be larger than the demagnetizing field of the readout core. If similar materials are employed for both cores, the information core may be fabricated with a somewhat greater cross-sectional dimension so that the external demagnetizing field will be greater. The conductors are preferably relatively thin strips, webs or films of a conductor such as copper or the like. The various films, which are shown with an exaggerated cross-sectional dimension, are held in the desired relative position along the substrate surface, the spacer elements 22—22 being employed to properly maintain spacing between the individual elements. Of course, in order to avoid shorting of the individual conductors, suitable electronic insulation means, not shown, may be provided.

The preferred compositions for the films are those certain alloys of nickel and iron that comprise from between about 81% and 83% nickel, balance iron. As indicated previously, the specific composition of the individual alloys or materials employed in the multicore elements may be taken from a wide list of available substances, hence it will be appreciated that these examples are given in the way of illustration only and are accordingly not to be construed in a limiting sense. The conductors may be, for example, 5 mil copper, 100 mils wide, where used with ferromagnetic materials shown above having a diameter of about 300 mils and a thickness of less than about 2500 A.

*Example 1*

A melt consisting of 83% nickel-17% iron is utilized to evaporatively fabricate one ferromagnetic film body to serve as a readout core along the surface of a glass substrate, the ferromagnetic body having a diameter of 300 mils and a thickness of 2000 A. units. During preparation, the evaporation is conducted at a pressure of $10^{-6}$ mm. Hg, the melt temperature is maintained by induction heater at a level of 1600° C. and the substrate is held at a modestly elevated temperature of 150° C. A second ferromagnetic film body of the same composition as the first film body, is prepared along the surface of a second glass substrate. This film body also has a diameter of 300 mils; however, the thickness is increased to 4000 A. units. Evaporating conditions are employed which match those previously utilized in connection with the readout film. These evaporative operations are conveniently carried out in a bell jar enclosure or the like.

Conductors are next prepared along the surface of a 1 mil thick film of a thin polyester film prepared under stress and identified in the art as Mylar film. A band of copper 100 mils wide and 5 mils thick is suitable as a conductive coating member, photo-etching techniques being used to provide the preferred lines with suitable dimensions and required edge definition. The patterns are arranged as indicated in FIGURES 2 and 3 and are disposed along and between the individual and spaced film surfaces and immediately adjacent the substrate surfaces. Suitable complementary conductors are similarly prepared and arranged along the outer surfaces of the example, these conductors forming in combination, the legs of a "U" and enclosing the substrates therebetween. Spacer elements are set into the arrangement after which the element is ready for use.

Figure 5:
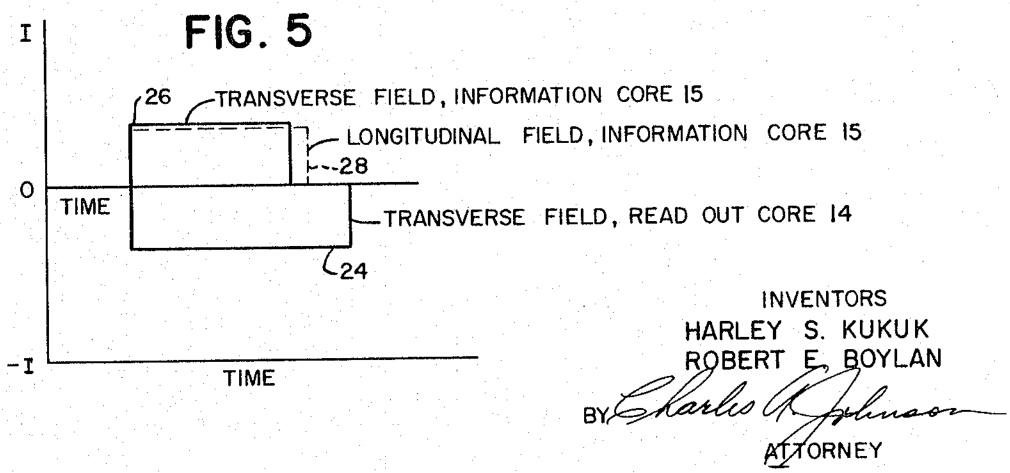
FIGURE 5 is a graphical representation of current pulses that may be utilized to actuate or control the apparatus of the present invention, the graph illustrating a plot of the current amplitude vs. time.

In order to write information into the memory element 10 of FIG. 2, appropriate electronic signals 24 and 26, see FIG. 5, are passed along the outer conductor segments 17 and 18, respectively, and thence along the common center conductor segment 16 and signal 28 is passed along the loop 20, the polarity sense of the signal 28 along the loop 20 being appropriate for the writing of either a binary "1" or a binary "0" as arbitrarily designated in the art. The field 26 established by the pulse along conductors 16 and 18 will be at a peak intensity in the area immediately between the individual conductor segments. The external influences of this field will be at a practical minimum due to the specific design of the arrangement. Stated another way, the physical design of the system substantially enhances the effect that a given signal may have upon a film located between the conductors carrying the current, and minimizes the effect that such signal will have upon a film located outside the conductors. These enhanced and minimized effects of the signals coupled to conductors 16, 17 and 18 are inherent characteristics of the illustrated embodiment of FIGS. 2, 3. By using "U"-shaped conductors the currents flowing along such conductors produce fields that, according to the well-known right-hand rule, provide a maximum field intensity in the area between the "U"-shaped conductor portions, i.e., are additive therein, but yet provide a minimum field intensity in the areas outside such portions, i.e., are subtractive therein. Accordingly, the magnitude of the current pulses may be minimized and the physical design limitations of the specific circuitry and components may be less stringent. These fields are, of course, maintained at a sufficient intensity to switch the core into proper remanent alignment. The readout core is simultaneously, with fields 26 and 28, subjected to a transverse field 24 along conductors 16 and 17, this field being maintained to assist the readout core to maintain a proper remanent alignment as determined by the demagnetizing field of the information core 15 after the fields 26 and 28 are removed. While the sequence of initial application of fields is not critical, it is preferred that the fields 24, 26 and 28 be applied simultaneously to the cores 14 and 15, the longitudinal field 28 for the information core 15 being continued after the transverse field 26 for the information core 15 has been terminated. The transverse field 24 for the readout core 14 must be continued after the other fields 26 and 28 have been terminated whereby the demagnetizing field of the information core 15 in the area of the readout core 14 enables the magnetization of the readout core 14 to be aligned with that of the information core 15. Reference is made to FIGURE 5 for an illustration of the time relationships existing in this system.

The pulse 28 that is applied to the digit line 20 creates, in the area of the information core 15, a longitudinal field that has an intensity that is less than the net effect of the coercive force of the information core and the demagnetizing field of the readout core, less the demagnetizing field of the information core. Using this intensity as a limit for the digit line 20 pulse 24, it is not possible to cause any switching to occur in adjacent information cores 15 of other memory elements 10 of a matrix array thereof. The combination of longitudinal field 28 and transverse fields 24 and 26 is, of course, adequate to suitably switch the particular information core 15 into the desired "1" or "0" state.

In reading-out the system, a transverse pulse 24 is applied to the readout core 14 by means of conductors 16 and 17, this pulse having an intensity that is sufficient to reversibly rotate the remanent magnetization existing therein. Upon termination of this transverse pulse 24, the magnetization of the readout core 14 will, of course, return to the remanent state as determined by the orientation of the magnetization of the information core 15. The polarity of the signal obtained in loop 20 upon the change of the orientation of the magnetization of the readout core 14 provides the information indicative of the remanent state of the information core 15. Accordingly, a binary "1" may be represented by a signal of a certain predetermined polarity and a binary "0" is indicated by a signal of opposite polarity.

Figure 4:
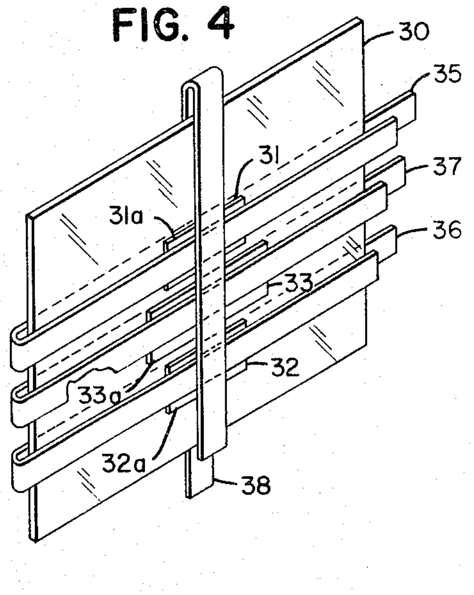
FIGURE 4 is a perspective view of a somewhat modified embodiment of the present invention.

Reference is now made to the non-destructive readout device shown in FIGURE 4 of the drawings wherein a single substrate base is provided with a single readout film, and a pair of associated information or bias films disposed adjacent thereto, all of the films being disposed along a common plane. The readout film is, of course, disposed within the magnetic fields of each of the information films and carries a magnetic orientation in a direction determined by the magnetic orientation of the bias films. Referring now specifically to the FIGURE, the substrate 30 is provided with a pair of bias films 31 and 32, these films being positioned immediately adjacent to the readout film 33. Write lines 35 and 36 are arranged to function in cooperative fashion in order to establish the magnetic orientation of the bias films 31 and 32 respectively. The readout line 37 is arranged around the readout film and is adapted to function when a readout event is indicated. Since line 38 is disposed about the major planar surfaces 31*a*, 32*a*, and 33*a* of each of the film members 31, 32 and 33 respectively (the opposite major surfaces being in contact with the substrate), and is also disposed with its central longitudinal axis substantially normal to the central longitudinal axis of the parallely disposed conductors 35, 36 and 37, it will be observed that each of the conductive paths are in the form of a "U" and, as such, they enclose the individual film members therein. The advantages and accompanying superior operation possible with the apparatus shown in FIGURE 2 and 3 is likewise available from the modification illustrated in FIGURE 4.

It is understood that suitable modifications may be made in the structure as disclosed, and provided such modifications may come within the spirit and scope of the appended claims. Having now, therefore, fully illustrated and described our invention, what we claim to be new and desired to protect by Letters Patent is:

1. A magnetic memory element providing nondestructive readout, comprising:

first and second open flux path type multi-stable-state cores of substantially similar ferromagnetic material having uniaxial anisotropy providing a magnetic easy axis along which each core's remanent magnetization shall reside and wherein each core is disposed in a magnetically interacting relationship with said cores' axes substantially aligned and with each core only partially closing the otherwise open flux path of the other, each of said cores effecting a demagnetizing field in the area of the other;

means inductively coupled to said cores for causing the magnetization of said cores to be aligned in a selected one of said stable-states;

means inductively coupled to said cores for producing a respective additive field intensity in the area of said first core for causing an enhanced effect upon the magnetization of said first core but a respective subtractive field intensity in the area of said second core for causing a minimized effect upon the magnetization of said second core;

sense means coupled at least to said first core, said enhanced effect upon the magnetization of said first core producing an output signal in said sense means the polarity of which is indicative of the said selected one stable-state.

2. Apparatus as in claim 1, wherein said first and second cores are comprised of ferromagnetic material exhibiting substantially similar coercivity characteristics.

3. Apparatus as in claim 2 wherein said second core exhibits a demagnetizing field in the area of said first core that is substantially larger than the demagnetizing field of said first core in the area of said second core.

4. A magnetic memory element providing nondestructive readout, comprising:

first and second open flux path type multi-stable-state cores of substantially similar ferromagnetic material each having uniaxial anisotropy providing a magnetic easy axis along which the core's remanent magnetization shall reside and each core disposed in a magnetically interacting, superposed, relationship with said axes substantially aligned and with each core only partially closing the otherwise open flux path of the other, each of said cores exhibiting substantially similar coercivities and effecting different intensity demagnetizing fields in the area of the other;

write-in means inductively coupled to said cores for causing the magnetization of said cores to be aligned in a selected one of said stable-states;

readout means inductively coupled to said cores for producing respective field intensities in the areas of said cores for causing an enhanced effect upon the magnetization of said first core but a minimized effect upon the magnetization of said second core;

sense means inductively coupled to said first core, said enhanced effect upon the magnetization of said first core producing an output signal in said sense means the polarity of which is indicative of the said one selected stable-state.

5. A magnetic memory element providing nondestructive readout, comprising:

an open flux path type multi-stable-state information core and an open flux path type multi-stable-state readout core arranged in a magnetically coupled relationship, said cores having substantially similar coercivity but different demagnetizing field properties and being composed of thin ferromagnetic material having single-domain properties capable of providing single-domain rotational switching and having the characteristic of uniaxial anisotropy providing a magnetic easy axis along which the core's remanent magnetization shall reside;

write-in means inductively coupled to said cores for setting the magnetization of said cores into a selected one of said stable-states;

readout means inductively coupled to said cores for providing additive fields in the area of said readout core and subtractive fields in the area of said information core for causing a nondestructive enhanced effect upon the magnetization of said readout core and a minimized effect upon the magnetization of said information core; and sense means inductively coupled to said readout core for sensing the said enhanced effect upon the magnetization of said readout core when affected by said readout means for producing an output signal indicative of the said one selected stable-state of said cores.

6. A magnetic memory element providing nondestructive readout, comprising:

an information core and a readout core, each of said cores being of substantially similar thin ferromagnetic material and being multistable-state, open flux path cores having single-domain properties capable of providing single-domain rotational switching and possessing the characteristic of uniaxial anisotropy providing a magnetic easy axis along which the core's remanent magnetization shall reside, said cores arranged in a magnetically coupled relationship with their easy axes aligned;

the demagnetizing field of the information core in the area of the readout core being substantially larger than the demagnetizing field of the readout core in the area of the information core;

a first conductor arranged with its longitudinal axis oriented transverse to said easy axes and magnetically coupled to said cores, said conductor arranged for selectively coupling alternative first or second write signals to said cores during the writing operation, and for sensing changes in the magnetic state of said readout core during the readout operation;

a second conductor in the form of a "U"-shaped conductive plane substantially enclosing said information core and arranged with the longitudinal axis of each leg of said "U"-shaped conductive plane parallel to said easy axes, one leg of said second conductor interposed between said superposed cores and the other leg of said second conductor arranged for receiving a third write pulse for causing the magnetization of said information core to be rotated out of alignment with its easy axis, said third write signal coincident with and continued in time after the termination of the coupling of said alternative first or second write signals, the interaction of said coincident signals and the demagnetizing field of the information core in the area of the readout core causing the magnetization of said cores to be set into a selected one of said stable-states as determined by the selection of said alternative first or second write signals; and a third conductor in the form of a "U"-shaped conductive plane substantially enclosing said readout core and arranged with the longitudinal axis of each leg of said U-shaped conductive plane parallel to said easy axes, one leg of said third conductor interposed between said superposed cores and the other leg of said third conductor arranged for alternatively receiving a fourth write signal during a writing operation for controlling the state of said readout core or for receiving a read signal during a readout operation for effecting an additive, enhanced field intensity in the area of said readout core and a subtractive, minimized field intensity in the area of said information core for effecting a substantial, but reversible, rotation only of said readout core's magnetization thereby inducing an output signal in said first conductor, the polarity of which is indicative of the said selected stable-state.

7. Apparatus as in claim 6 wherein the respective legs of said second and third conductors interposed between said superposed cores are electrically coupled forming a common return line.

8. Apparatus as in claim 7 wherein said electrically coupled respective legs are integrally formed of a unitary sheet of conductive material.

9. A magnetic memory element providing nondestructive readout, comprising:

an information core and a readout core, said cores being multistable-state, open flux path cores of thin, substantially similar, ferromagnetic materials having single-domain properties and possessing the characteristic of uniaxial anisotropy for providing an easy axis along which the core's remanent magnetization shall reside;

said cores arranged in a magnetically coupled, superposed relationship with their easy axes aligned;

first, second, and third conductors arranged in a superposed relationship with their longitudinal axes aligned with the aligned easy axes of said cores;

said first, second, and third conductors being intercoupled at one end;

said second conductor arranged intermediate said cores;

said first conductor arranged along the opposite surface of said readout core from said second conductor for forming a first "U"-shaped conductor;

said third conductor arranged along the opposite surface of said information core from said second conductor for forming a second "U"-shaped conductor;

a first transverse field provided by an energized first "U"-shaped conductor having an additive effect in the area of said readout core for having an enhanced effect thereon and having a subtractive effect in the area of said information core for having a minimized effect thereon;

a second transverse field provided by an energized second "U"-shaped conductor having an additive effect in the area of said information core for having an enhanced effect thereon and having a subtractive effect in the area of said readout core for having a minimized effect thereon;

fourth and fifth conductors arranged in a superposed relationship with their longitudinal axes aligned, said aligned longitudinal axes oriented transverse the aligned easy axes of said cores;

said fourth and fifth conductors being intercoupled at one end for forming a third "U"-shaped conductor that envelops said cores;

a first longitudinal field provided by an energized third "U"-shaped conductor having an additive effect in the areas of said cores for having an enhanced effect thereon;

the coincident application of said first and second transverse fields and said first longitudinal field causing the magnetization of said cores to be set into a first or second and opposite information state of remanent magnetization.

10. The magnetic memory element of claim 9 wherein the demagnetizing field of the information core in the area of the readout core is larger than the demagnetizing field of the readout core in the area of the information core.

11. The magnetic memory element of claim 10 wherein said first longitudinal field is continued after the termination of said first and second transverse fields for combining with the demagnetizing field of the information core in the area of the readout core for causing the magnetization of the readout core to be set in an aligned relationship with the demagnetizing field of the information core in the area of the readout core.

12. The magnetic memory element of claim 10 wherein when only said first transverse field is provided is there induced in said third "U"-shaped conductor an output signal the polarity of which is indicative of the informational state of said information core.

References Cited by the Examiner

UNITED STATES PATENTS

| | | | |
|---|---|---|---|
| 3,015,807 | 1/1962 | Pohm et al. | 340—174 |
| 3,125,743 | 3/1964 | Pohm et al. | 340—174 |
| 3,188,613 | 5/1965 | Fedde | 340—174 |
| 3,191,162 | 5/1965 | Davis | 340—174 |

BERNARD KONICK, *Primary Examiner.*

G. LIEBERSTEIN, S. M. URYNOWICZ, *Assistant Examiners.*